United States Patent [19]
Kashihara et al.

[11] Patent Number: 5,652,680
[45] Date of Patent: Jul. 29, 1997

[54] PROJECTION LENS UNIT

[75] Inventors: Takashi Kashihara, Nara; Tadayoshi Yamada, Toyono-gun, both of Japan

[73] Assignee: Matsushita Electric Industrial Co., Ltd., Osaka, Japan

[21] Appl. No.: 557,418

[22] Filed: Nov. 13, 1995

[30] Foreign Application Priority Data

Nov. 15, 1994 [JP] Japan .................. 6-280555

[51] Int. Cl.$^6$ .................. G02B 7/02
[52] U.S. Cl. .................. 359/819; 359/811; 359/827; 359/820; 359/513
[58] Field of Search .................. 359/819, 811, 359/809, 808, 827, 830, 820, 824, 665, 666, 513

[56] References Cited

U.S. PATENT DOCUMENTS

| 4,740,058 | 4/1988 | Hori et al. | 359/827 |
| 4,948,226 | 8/1990 | Ozaki | 359/819 |
| 5,157,554 | 10/1992 | Kashihara | 359/820 |
| 5,202,706 | 4/1993 | Hasegawa | 359/819 |
| 5,272,540 | 12/1993 | Hirata et al. | 358/237 |
| 5,305,145 | 4/1994 | Tanaka | 359/513 |
| 5,446,591 | 8/1995 | Medlock | 359/666 |

FOREIGN PATENT DOCUMENTS

| 0 133 440 | 2/1985 | European Pat. Off. . |
| 2 009 957 | 6/1979 | United Kingdom . |

*Primary Examiner*—Loha Ben
*Attorney, Agent, or Firm*—McDermott, Will & Emery

[57] ABSTRACT

In the optical coupling system where the space between projection lens and CRT is connected with a liquid, this invention aims to offer a projection lens unit wherein the angle of CRT relative to the optical axis of projection lens (tilt angle) may be changed by quite a simple operation; thereby the CRT tilt angle can be reset to an optimum when the angle of projection oblique to a screen shifts. Namely, a first housing and a second housing in which an optical coupling liquid is contained and sealed are coupled together with an watertight structure like a piston and cylinder and fixed, and a ring cam for regulating the relative space and tilt is held between the two housings; by fastening the two housings together with bolts, etc. the two housings can be set at a desired relative positioning.

11 Claims, 10 Drawing Sheets

PROJECTION LENS UNIT

BACKGROUND OF THE INVENTION

1. Field of the Invention

This invention relates to a projection lens unit and a video projection system for projecting and magnifying a picture of a relatively small cathode ray tube, liquid crystal display device, etc. onto a larger screen.

2. Description of the Prior Art

In order to obtain large size images, video projection systems are well known and widely used in various applications; such systems take a picture of a TV program or computer output from a relatively small cathode ray tube (CRT) screen and project and magnify it through a projection lens onto a larger screen. In most of these systems, the projection lens and the CRT are optically coupled by filling the gap between them with a highly transparent liquid in order to improve the clearness and contrast of the projected image. Such method is usually called Optical Coupling (OC).

One example of the prior art is shown in FIG. 7. Numeral 1 denotes a projection lens, and 2 denotes an OC housing having a CRT 3, with a screen on which a picture is produced, mounted on the right side and an OC lens 4, the rightmost component of the projection lens 1, mounted on the left side. The OC housing 2 is provided with a gutter 5, in which a sealing rubber 6 is affixed. When the OC lens 4 is mounted on the OC housing 2 from the left, the sealing rubber 6 is pressed and deformed to tightly stick to the surface of OC lens 4, and a watertight sealing is prepared. From the right side of OC housing 2, the CRT 3 is inserted up to a predetermined position, and in the gap between the inner surface of OC housing 2 and the side wall of CRT 3, a rubber string 7 having an even thickness slightly larger than the gap is pushed into covering the entire circumference of CRT 3 for the purpose of setting the up/down and right/left positioning of CRT 3 as well as preventing adhesive from escaping. Later on, the gap is filled with silicone rubber adhesive 8 for the watertight sealing.

At the top of the OC housing 2 is a pressure adjusting hole 9. A diaphragm 10, made of elastic material such as rubber, is mounted over the pressure adjusting hole 9. The diaphragm 10 has around its rim a pressure sealing part 11, which is seated in a sealing groove formed around the pressure adjusting hole 9. A holding cover 12 is mounted over the pressure adjusting hole 9 and diaphragm 10. The holding cover 12 presses the pressure sealing part 11 against the OC housing 2, thereby providing a watertight OC chamber 14 surrounded with OC housing 2, CRT 3, and OC lens 14. The holding cover 12 includes a ventilation hole 13 which exhausts air when the diaphragm 10 moves upward.

After the unit has been assembled as illustrated in FIG. 7, the OC chamber 14 is filled with an optical coupling liquid 15 (OC liquid), and the pressure adjusting hole 9 is covered with the diaphragm 10 and sealed watertight. Suitable OC liquids include ethylene glycol, ethylene glycol mixed with glycerin, and ethylene glycol mixed with glycerin and a small amount of pure water.

FIG. 8 outlines the structure of a widely used 3-CRT video projector. One projector employs three sets of projection opticals 21, 22 and 23 as described above; monochrome images each in red, green and blue are projected through each of the projection opticals onto a screen 60 to be composed there as a color image. The optical axis of projection opticals 21 in the middle is perpendicular to the screen, however, the optical axes of projection opticals 22 and 23 located in the sides each have an angle θ (this angle is called the concentration angle) to the screen. Namely, they are projected optically oblique.

FIG. 9 illustrates a projector (side view) hanging from a ceiling for projection on a screen 60 on a wall, etc. In this case, all the axes of the projection opticals 21, 22 and 23 are oblique to the screen 60. The axes of the projection opticals in the sides 22 and 23 are oblique in both the vertical direction and the horizontal direction to the screen.

FIG. 10 explains the relative positioning among projection lens 23a, CRT 23b and screen 60 in the oblique projection. The optical axis of lens has an angle of incidence α to the screen; consequently, CRT 23b needs to be tilted in accordance with the rules of optics by an angle β. If the angle of incidence α changes, the tilt angle β of the CRT should also be changed accordingly. If the projection distance is changed to vary the size of the projected image, the concentration angle θ as defined in FIG. 8 should also be changed. The concentration angle θ equals the angle of incidence α in FIG. 10. Therefore, the CRT tilt angle β needs to be changed along with the change of the concentration angle θ.

As already described above, a change in projection distance results in a change of the concentration angle of the projection lens, therefore the tilt angle β of the CRT should also be changed. In the prior art projection lens units having an optical coupling as illustrated in FIG. 7, the space between the projection lens and the CRT 3 is watertight and assembled at a predetermined angle in the factory; it is impossible to change the CRT tilt angle after assembly. Therefore, various constituent components must be prepared in the factory in accordance with the prospective projection distances that are predetermined in several ranges. The CRT 3 is assembled with such components so as to have a specific tilt angle suitable to a range of prospective projection distances.

Disadvantageously, this means that the CRT needs to be manufactured in several models to cover the ranges of prospective projection distances. The increase in number of CRT models means that there is an increased number of components in the inventory. Further, production control and inventory control both for each CRT model and component can be very complicated inviting a substantial increase of expenses. In the event the CRTs of a certain distance model are in short supply, other CRT models in stock can not serve serve as substitutes if the distance range is different; then, the supplier has to manufacture the CRTs from the beginning, which takes a long time before delivery.

None of the configurations described above provides the important advantage of flexibly projecting pictures for a variety of distance ranges without manufacturing a number of different models. In particular, the prior configurations do not provide the advantages of a variable CRT tilt angle, a variable concentration angle and a minimal number of components.

SUMMARY OF THE INVENTION

In the projection lens units, in which the gap between projection lens and a picture display element, preferably a CRT, is connected by means of a so-called Optical Coupling, this invention aims to offer a projection lens unit wherein the angle of the CRT (tilt angle) relative to the optical axis of projection lens is adjustable by quite a simple operation. This enables a user to reset a CRT to have an optimum tilt angle when the angle of projection to the screen shifts.

In order to implement the above-mentioned objective, a projection lens unit according to the invention has two divided OC housings, a first OC housing and a second OC housing, and the angle of tilt and the space between the two housings are made adjustable and connectable in a watertight manner.

Between the first OC housing and the second OC housing, a ring cam for setting the clearance and tilt angles is held in order to adjust the space and the angle between the two housings. Fastening the two housings with the ring cam in between creates a structure wherein the space and the tilt angle between the projection lens and the CRT can be fixed after being adjusted with a simple operation.

The OC housing, which was conventionally a single component structure, is divided into two parts, a first OC housing and a second OC housing. The two housings have a coupling mechanism like a piston and cylinder, and they are connected and sealed watertight with a rubber O-ring provided in the clearance between the two housing elements. Because these are connected like a piston and cylinder, the spacing and the tilt angle between the two housings are adjustable within a certain range. The two housings can be united at a desired spacing and tilt angle and fastening the first OC housing to the second OC housing with screw bolts, etc., the ring cam having a specified thickness and tilt between the two.

The projection lens and the CRT can be set at a desired space and tilt angle by, for example, mounting the projection lens on the first OC housing and mounting a picture display device like a CRT on the second OC housing.

As pointed out in greater detail below, the adjustable spacing and tilt angle between the two housings of this invention provides important advantages. The projection lens unit of this invention can project pictures onto screens that may be at a variety of distances. In particular, a specialized unit does not have to be manufactured for every distance.

The invention itself together with further objects and attendant advantages will best be understood by reference to the following detailed description taken in conjunction with the accompanying drawings.

DETAILED DESCRIPTION OF THE INVENTION

Now a preferred embodiment of the invention is described referring to FIGS. 1–4.

Figure 1:
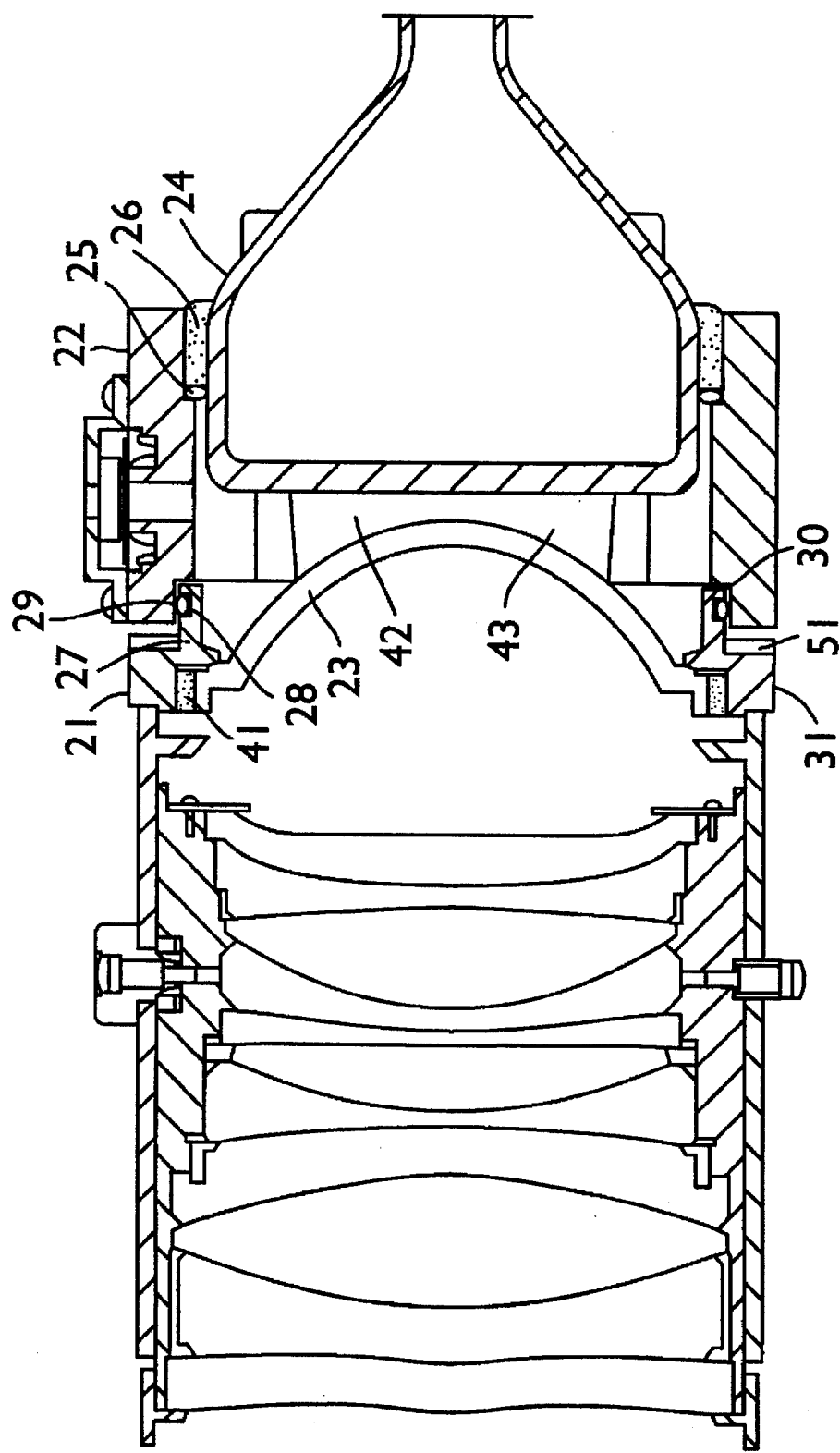
FIG. 1 shows a cross-sectional view of a projection lens unit according to the present invention side view.

FIG. 1 is a cross-sectional side view showing a preferred embodiment of the invention. On a first OC housing 21, an OC lens 23 is mounted in a watertight manner with silicone rubber adhesive from the left side. In a space between the cylindrical part formed at the circumference of OC lens 23 and the OC housing 21 is a relatively thick layer of an adhesive 41 formed evenly around the whole circle. The adhesive layer 41 consists of a silicone rubber adhesive that has a fluidity in the initial stage and is polymerized and ripened after 1–2 hours of storage in a high temperature ambient around 80°–100° C. After ripening, the adhesive layer 41 becomes a rubbery elastic material having a strong adhesive force.

From the right side of a second OC housing 22, a CRT 24 is inserted up to a predetermined position. In the gap between the inner surface of the OC housing 22 and the side wall of the CRT 24, a rubber string 25 having an even thickness slightly larger than the gap is pushed into the gap to cover the entire circumference of the CRT 24 for the purpose of setting the up/down and right/left positioning of the CRT 24 as well as preventing adhesive from escaping. Later on, the gap is filled by injecting silicone rubber adhesive 26 for completing the watertight sealing.

Each of the first OC housing 21 and the second OC housing 22 is an independent body made to be connectable like a piston and cylinder; the two are of course separable.

Figure 2:
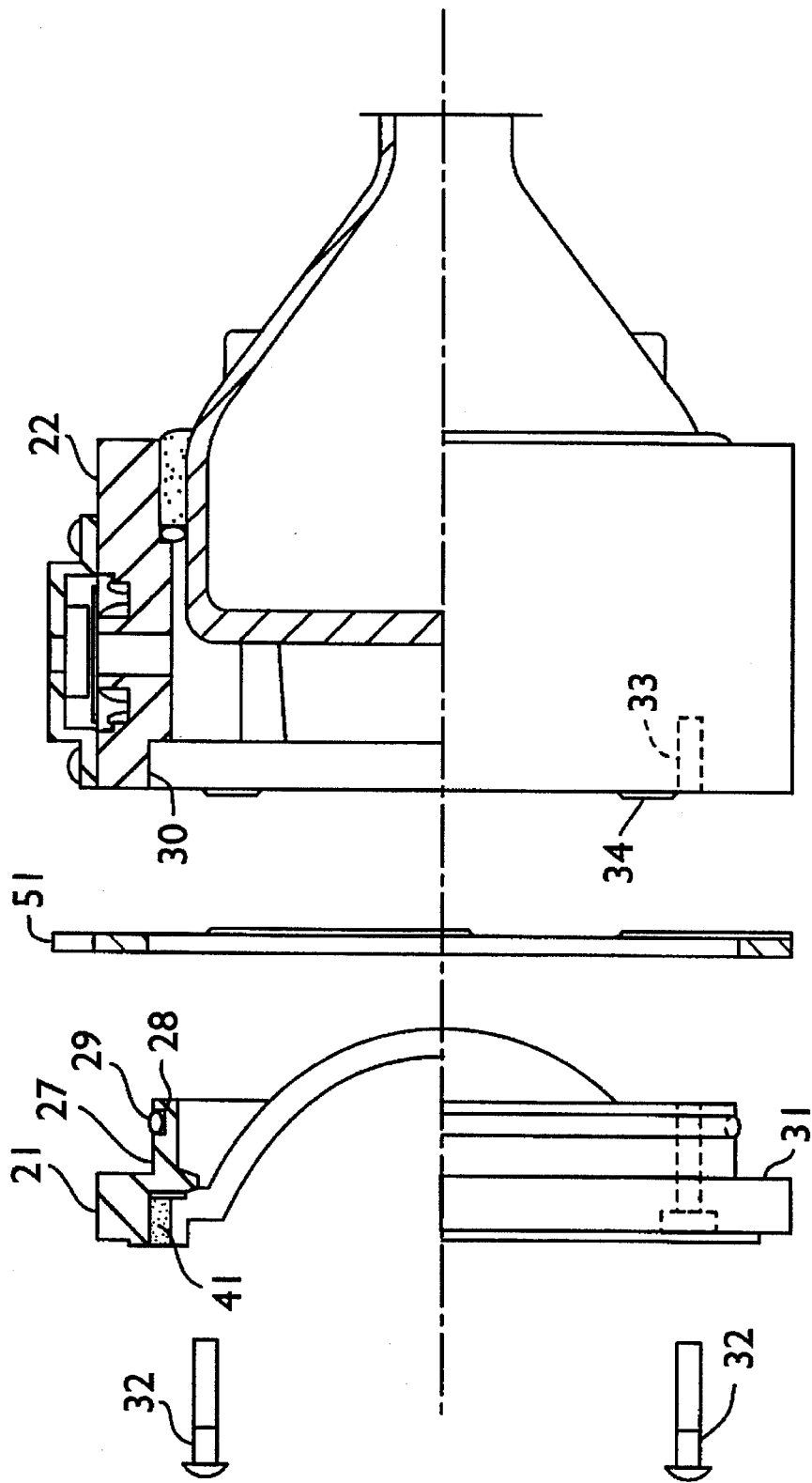
FIG. 2 shows the projection lens unit in an intermediate stage of FIG. 1 before the OC housings are fastened together.

In FIG. 2, the projection unit in an intermediate stage before the first OC housing 21 and the second OC housing 22 are connected is shown. The OC housing 21 has a cylindrical extrusion 27 provided with a gutter 28, for an O-ring 29, around the outer surface. The O-ring 29 is affixed around the gutter 28.

Figure 3:
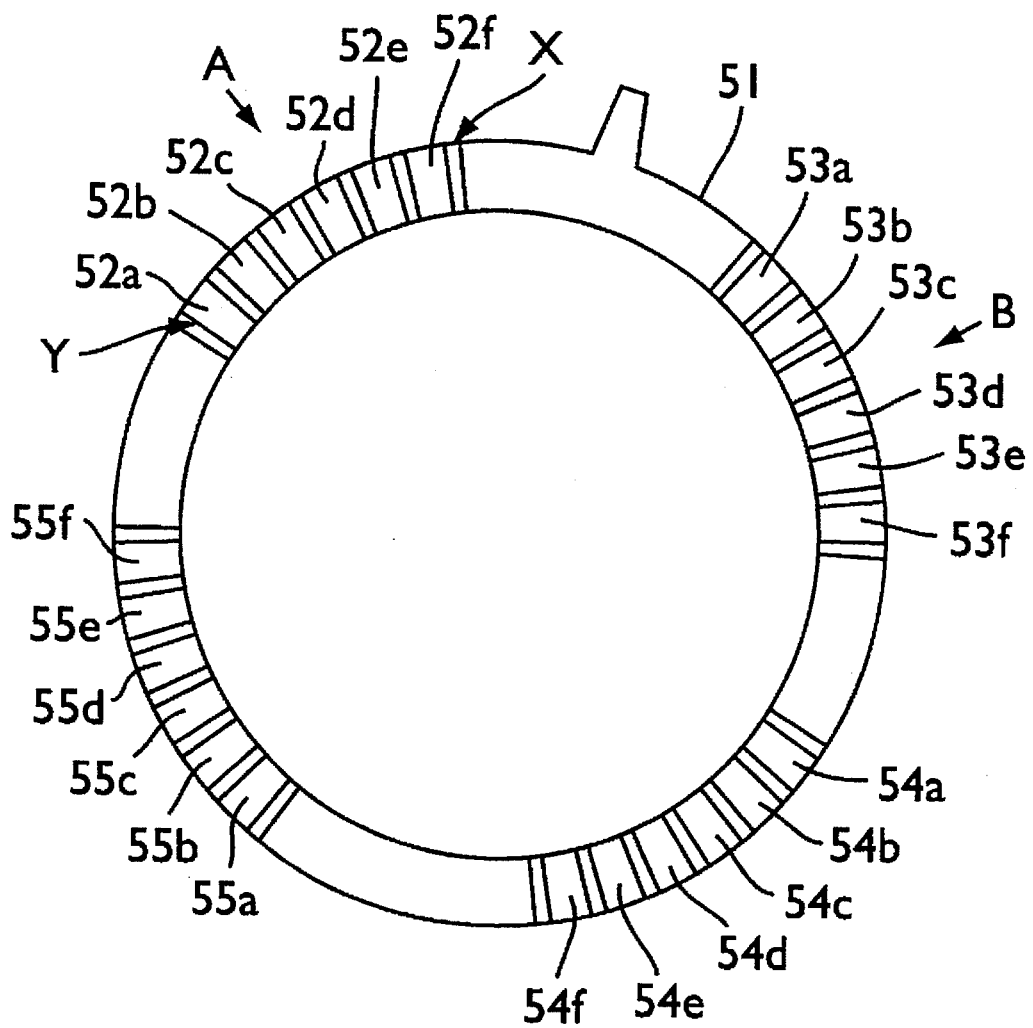
FIG. 3 shows a cam ring of FIG. 2.

The OC housing 22 has a cylindrical hollow 30 for accepting the cylindrical extrusion 27. When the cylindrical extrusion 27 is inserted, the O-ring 29 is depressed to deform, sticking tightly to the inner surface of the cylindrical hollow 30 and the bottom of the gutter 28; as a result, a watertight sealing is achieved. Before the OC housing 21 and the OC housing 22 are connected, a ring cam 51, for setting the space and the tilt angle as shown in FIG. 3, is put on the cylindrical extrusion 27. The ring cam 51 is revolvable around the cylindrical extrusion 27.

Figure 4B:
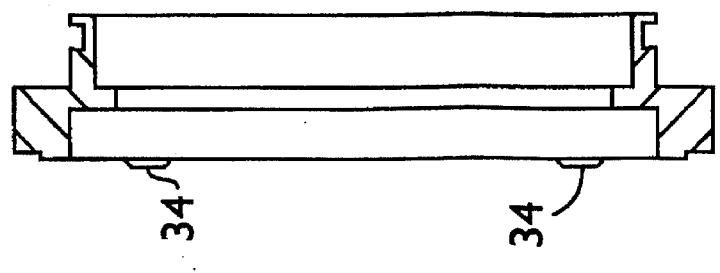
FIG. 4(b) shows a sectional side view of a second OC housing.
Figure 4A:
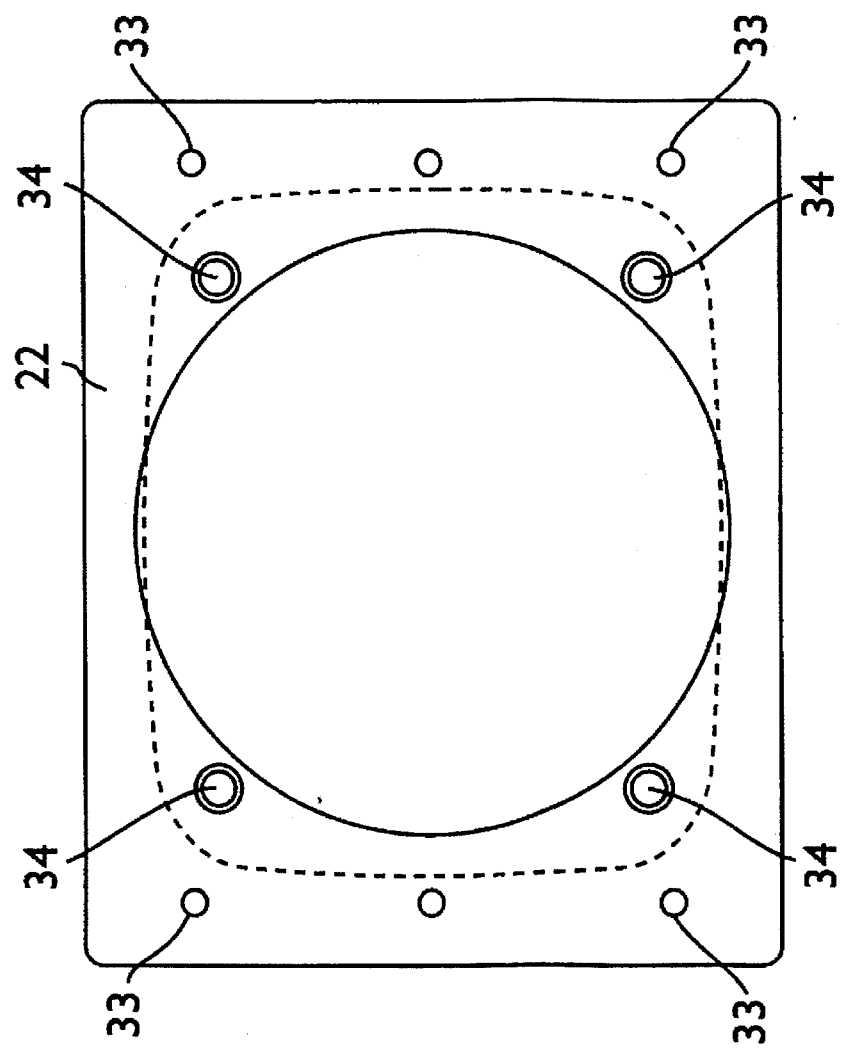
FIG. 4(a) shows a front view of a second OC housing.

FIGS. 4(a) and (b) show the front view and the cross-sectional side view, respectively, of the OC housing 22. On the front surface, a stud 34 is formed in four places. The ring cam 51 is sandwiched between the studs 34 and the rear face 31 of the OC housing 21.

As shown in FIG. 2, the OC housing 21 and the OC housing 22 are fastened by a bolt 32, which screws in a female screw 33 of OC housing 22 through a through hole of OC housing 21. By tightly screwing the bolts 32, the OC housing 21 and the OC housing 22 are fastened together holding the ring cam 51 in between.

And then, a watertight OC chamber 42 formed by four elements, OC housing 21, OC housing 22, OC lens 23 and CRT 24, is filled with an OC liquid 43.

The ring cam 51 has, on its four regions in the circumference, face zones having different thicknesses, 52a–52f, 53a–53f, 54a–54f and 55a–55f, as shown in FIG. 3.

Figure 5A:
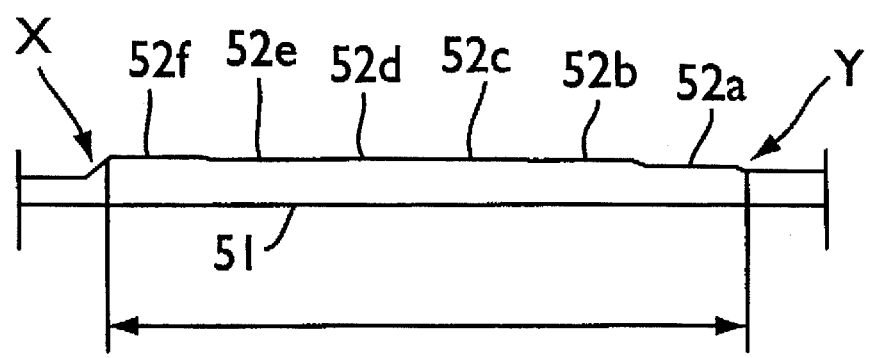
FIGS. 5(a) and 5(b) show side views of face zones provided on a cam ring of FIG. 3.
Figure 5B:
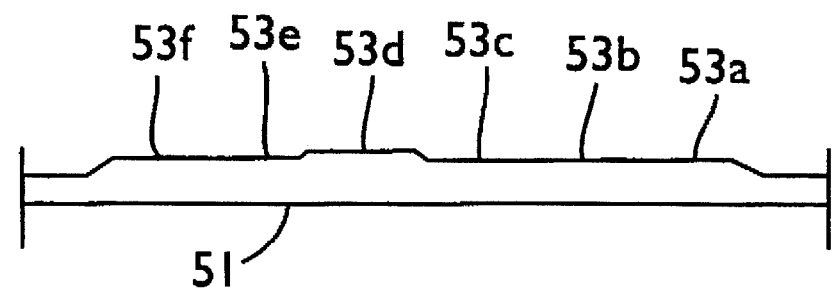

FIG. 5(a) illustrates the conceptual structure of one of the regions, showing the face zones 52a–52f viewed from the arrow index A, and FIG. 5(b) the face zones 53l–53f viewed from the arrow index B. The face zones 52a–52f as well as 53a–53f, each of the zones having different heights, are shaped continuously.

Figure 6:
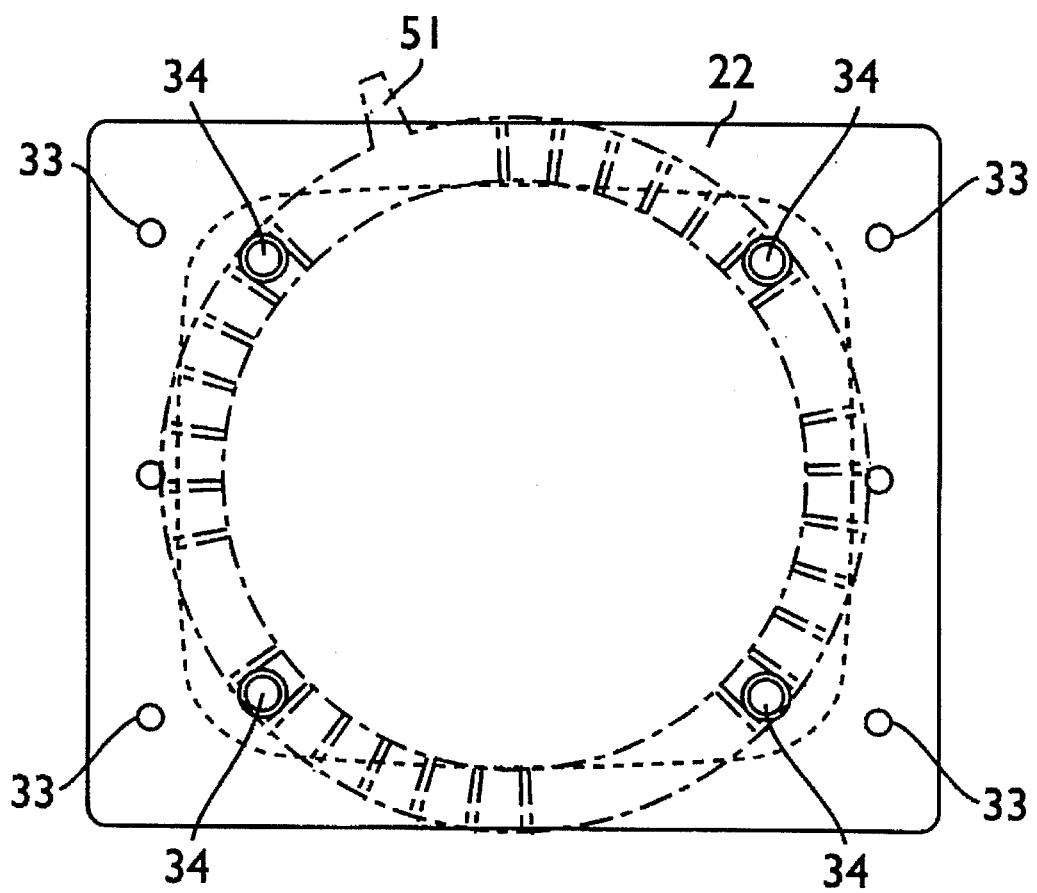
FIG. 6 shows a cam ring superposed on a second OC housing.
Figure 7:
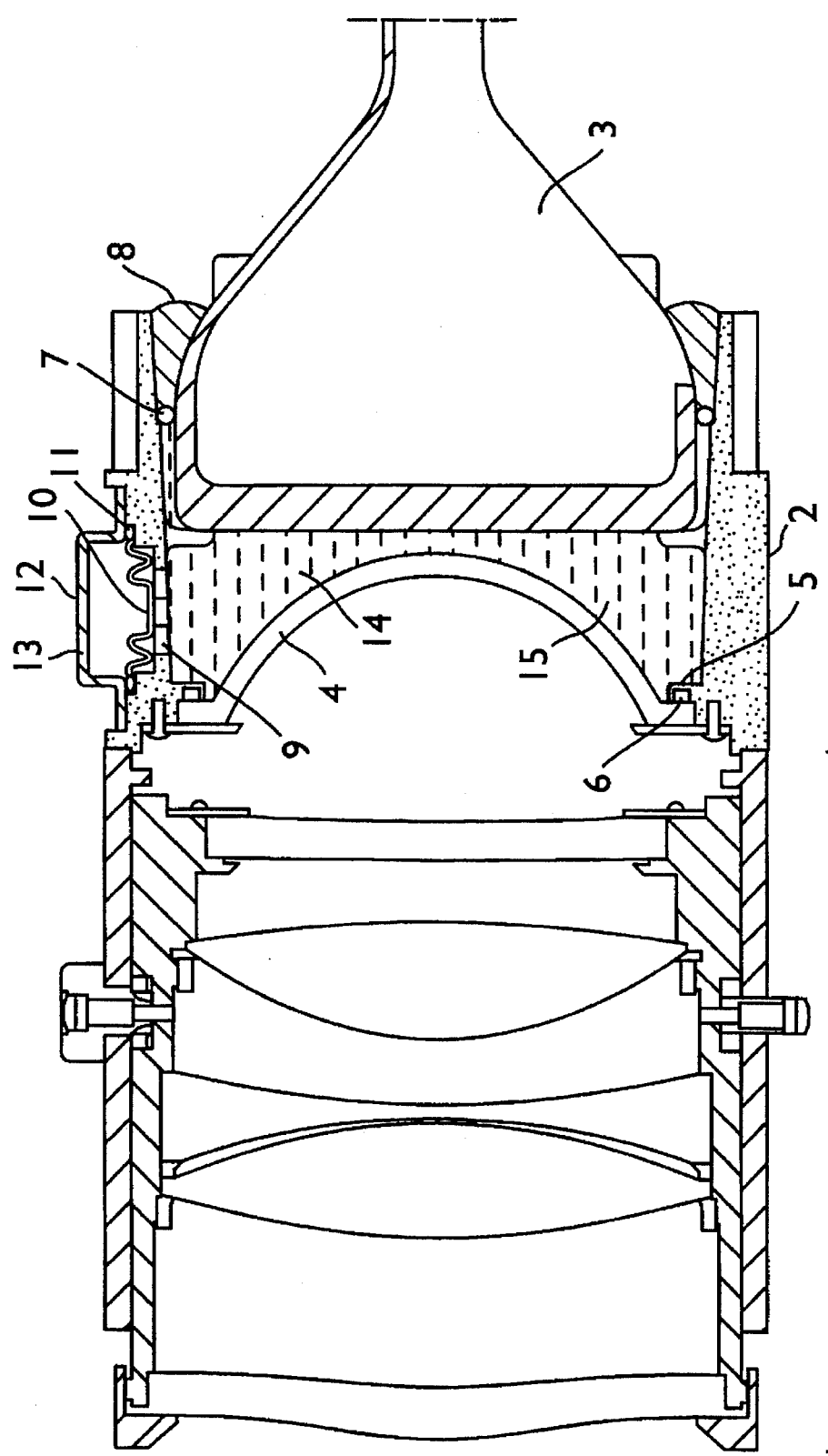
FIG. 7 shows a cross-sectional view of a conventional projection lens unit, side view.
Figure 8:
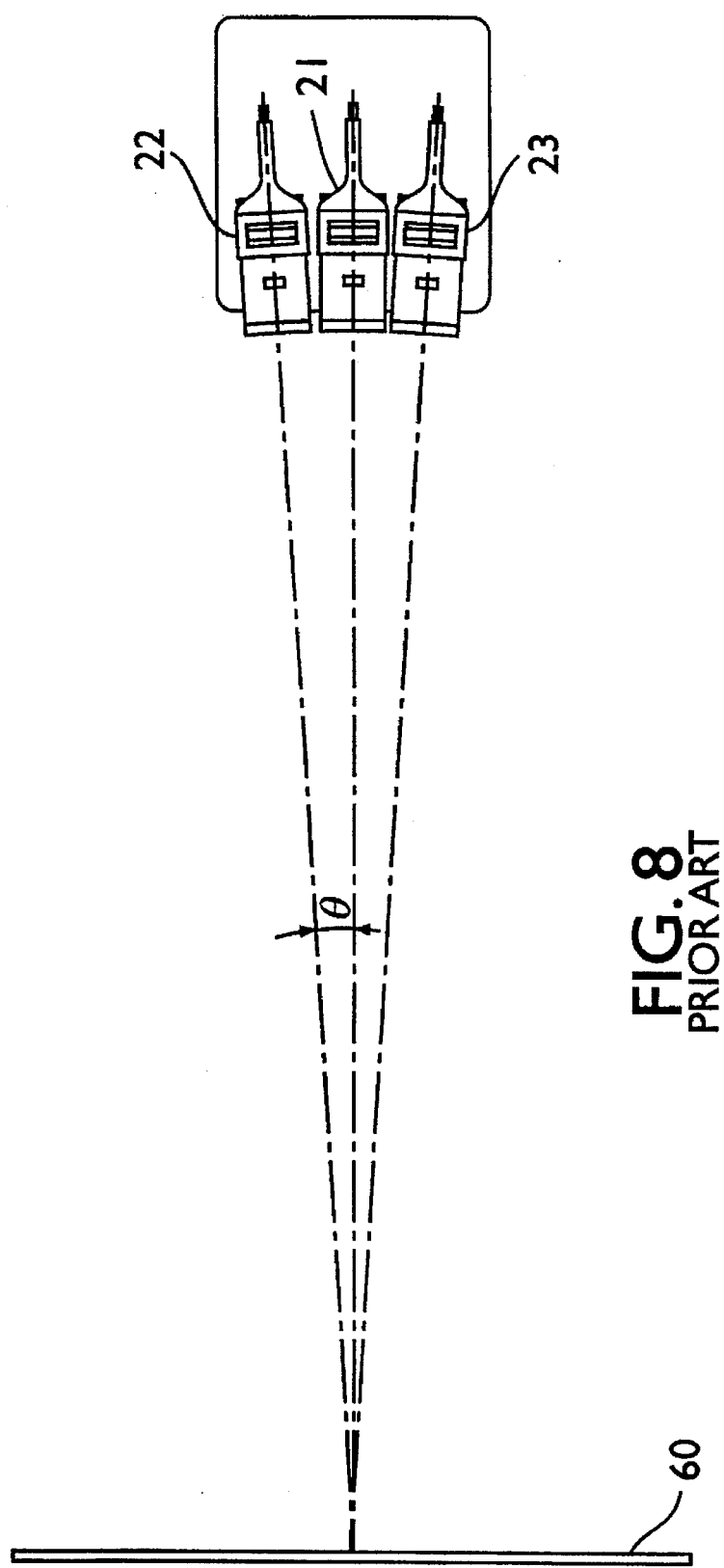
FIG. 8 illustrates an installation of a conventional 3-CRT projector.
Figure 9:
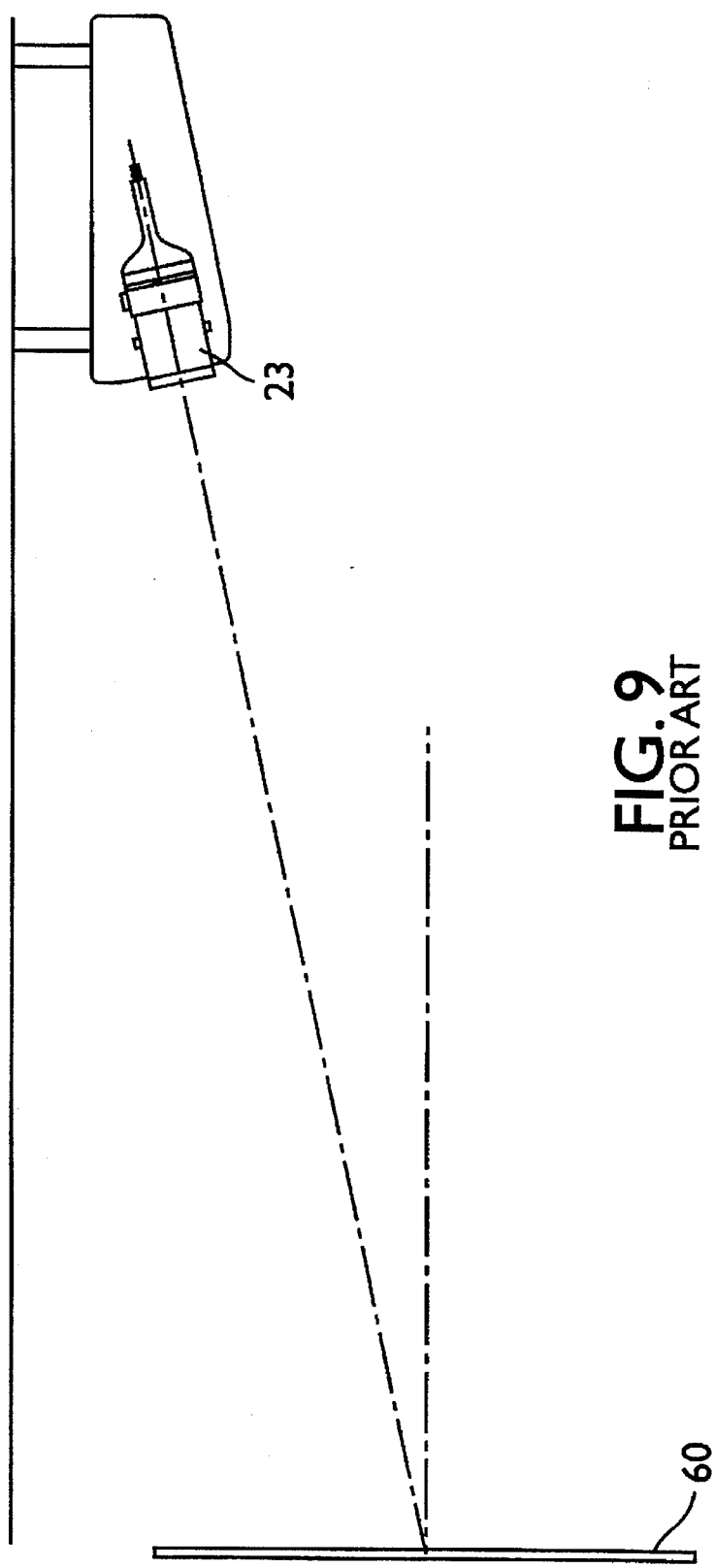
FIG. 9 illustrates a projection by a 3-CRT projector hanging from the ceiling.
Figure 10:
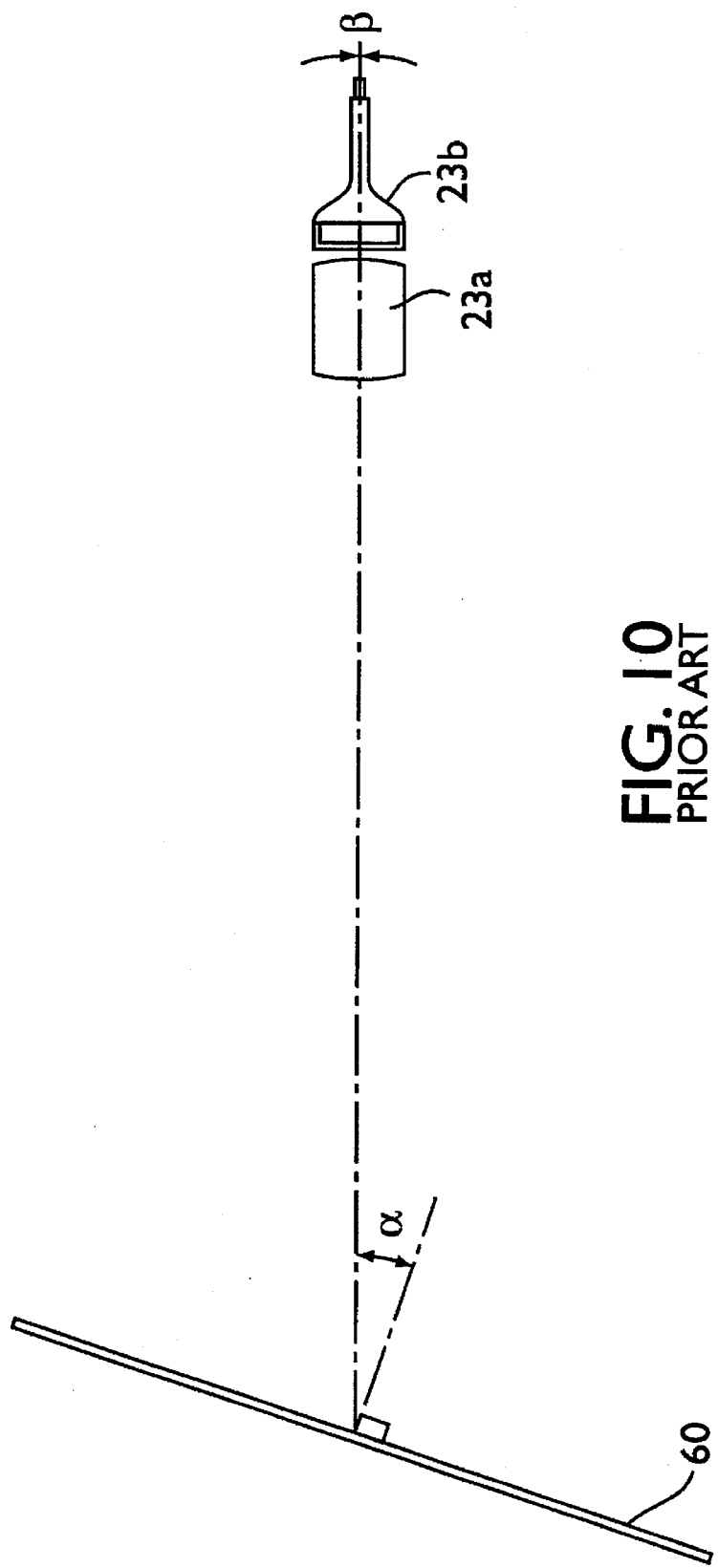
FIG. 10 illustrates a projection from an oblique direction.

FIG. 6 shows the ring cam 51 superimposed on the OC housing 22. The studs 34 provided in four places on the front surface of OC housing 22 touch the face zones 52a(b–f), 53a (b–f), 54a (b–f), 55a (b–f) formed on said ring cam 51.

With the above-mentioned configuration, the operation of this preferred embodiment is described below.

When the OC housing 21 and the OC housing 22 are fastened with the ring cam 51 in between, the two housings are fixed, keeping the gap equal to the thickness of the face zones, 52a(b–f), 53a (b–f), 54a (b–f) and 55a (b–f), at each of the places of the stud 34. In the event that the thickness of each of the face zones 52a, 53a, 54a and 55a is the same, then the OC housing 21 and the OC housing 22 are fixed parallel with a certain clearance, without any tilt.

By shaping each of the four face zones to form a combination (e.g. 52b, 53b, 54b and 55b) to have a specific thickness, the two housings can be connected at a desired clearance and tilt angle when fastened together with the bolts 32.

Change of the tilt angle and the clearance is conducted by a simple operation, i.e., loosening the bolts 32 and revolving the ring cam 51 to another combination of face zones, and tightening the bolts 32 again.

Although six combinations of face zones are exemplified in this embodiment, more combinations may be provided. For example, the number of face zones may be increased. As another example, although the preferred embodiment includes a CRT for the picture display element, the picture display element could be a liquid crystal display or some other display.

As described above, the invention makes it possible to adjust the angle of tilt between projection lens and CRT by a simple operation. This is particularly advantageous since the angle of tilt needs to be optimized depending on the change in projection distance even in projection opticals having an optical coupling.

In the prior art technology, it was necessary to prepare the units in plural models having different tilt angles to satisfy the application requirements of different projection distances. The models are not interchangeable to other applications if the projection distance is different.

In contrast, a projection lens unit according to the described invention complies with the whole range of projection distances with one model. Therefore, there is no need to keep plural product models in stock. Advantageously, the production and stock controls can be simplified, and the speed of responding to customers can be faster.

Of course, it should be understood that a wide range of changes and modifications can be made to the preferred embodiment described above. It is therefore intended that the foregoing detailed description be regarded a illustrative rather than limiting and that it be understood that it is the following claims, including all equivalents, which are intended to define the scope of this invention.

We claim:

1. A projection lens unit comprising:
   a picture display element;
   a projection lens for magnifying and projecting a picture displayed on the picture display element;
   a first optical coupling housing on which the projection lens is mounted maintaining a watertight seal between the first optical coupling housing and the projection lens; and
   a second optical coupling housing on which said picture display element is mounted maintaining a watertight seal between the second optical coupling housing and said picture display element,
   wherein said first and the second optical coupling housings are set together and fixed maintaining a watertight seal between said first and the second optical coupling housings, and
   wherein a cam ring for regulating a relative space and tilt angle is revolvably positioned between the first optical coupling housing and the second optical coupling housing.

2. A projection lens unit according to claim 1, wherein a relative space and tilt angle between said first optical coupling housing and second optical coupling housing can be fixed at a desired state by fastening the first optical coupling housing and the second optical coupling housing together with said cam ring positioned in between the first and second optical coupling housings.

3. A projection lens unit according to claim 1, or 2, wherein the cam ring in between said first optical coupling housing and said second optical coupling housing is provided with plural combinations of face zones on the circumference of said cam ring, and the relative space and tilt angle between said first optical coupling housing and second optical coupling housing can be variably set by revolving said cam ring interposed between said first optical coupling housing and second optical coupling housing to switch the face zones to other combination.

4. A projection lens unit comprising:
   a picture display element;
   a projection lens for magnifying and projecting a picture displayed on the picture display element;
   a first optical coupling housing on which the protection lens is mounted maintaining a watertight seal between the first optical coupling housing and the projection lens;
   a second optical coupling housing on which said picture display element is mounted maintaining a watertight seal between the second optical coupling housing and said picture display element; and
   a connecting means for maintaining the first and the second optical coupling housings in a watertight manner and for adjusting a tilt angle between the first and the second optical coupling housings.

5. A projection lens unit according to claim 4, wherein a cam ring for regulating a relative space and tilt angle is revolvably positioned between the first optical coupling housing and the second optical coupling housing.

6. A projection lens unit according to claim 5, wherein the relative space and tilt angle between said first optical coupling housing and second optical coupling housing can be fixed at a desired state by fastening the first optical coupling housing and the second optical coupling housing together with said cam ring positioned in between the first and second optical coupling housings.

7. A projection lens unit according to claim 5 and 6, wherein said cam ring in between said first optical coupling housing and said second optical coupling housing is provided with plural combinations of face zones on the circumference of said cam ring, and the relative space and tilt angle between said first optical coupling housing and second optical coupling housing can be variably set by revolving said cam ring interposed between said first optical coupling housing and second optical coupling housing to switch the face zones to other combination.

8. A projection lens unit comprising:
   a picture display element a projection lens for magnifying and projecting a picture displayed on the picture display element;

a first optical coupling housing on which the projection lens is mounted maintaining a watertight seal between the first optical coupling housing and the projection lens;

a second optical coupling housing on which said picture display element is mounted maintaining a watertight seal between the second optical coupling housing and said picture display element; and a connecting means for maintaining the first and the second optical coupling housing in a watertight manner and for adjusting a tilt angle between the first and the second optical coupling housings corresponding to a projection distance.

9. A projection lens unit according to claim 8, wherein a cam ring for regulating a relative space and tilt angle is revolvably positioned between the first optical coupling housing and the second optical coupling housing.

10. A projection lens unit according to claim 9, wherein the relative space and tilt between said first optical coupling housing and second optical coupling housing can be fixed at a desired state by fastening the first optical coupling housing and the second optical coupling housing together with said cam ring positioned in between the first and second optical coupling housings.

11. A projection lens unit according to claim 10, wherein said cam ring in between said first optical coupling housing and said second optical coupling housing is provided with plural combinations of face zones on the circumference of said cam ring, and the relative space and tilt angle between said first optical coupling housing and second optical coupling housing can be variably set by revolving said cam ring interposed between said first optical coupling housing and second optical coupling housing to switch the face zones to other combination.

* * * * *

UNITED STATES PATENT AND TRADEMARK OFFICE
CERTIFICATE OF CORRECTION

PATENT NO. : 5,652,680

DATED : July 29, 1997

INVENTOR(S) : Takashi KASHIHARA et al.

It is certified that error appears in the above-indentified patent and that said Letters Patent is hereby corrected as shown below:

Col. 6, line 56, delete "and" and insert --or--.

Col. 8, line 2, after "tilt" insert --angle--.

Signed and Sealed this

Fourteenth Day of April, 1998

Attest:

BRUCE LEHMAN

Attesting Officer    Commissioner of Patents and Trademarks